(12) United States Patent
Mateski et al.

(10) Patent No.: US 8,787,401 B1
(45) Date of Patent: Jul. 22, 2014

(54) DISTRIBUTED ANTENNA SYSTEM WITH LOCATION DETERMINATION BASED ON PSEUDO-PILOT SIGNALS

(75) Inventors: Christopher J. Mateski, Overland Park, KS (US); Alan Falk, Olathe, KS (US); Darrin Mott, Gardner, KS (US); Julie A. Hart, Raymore, MO (US)

(73) Assignee: Sprint Communications Company LLP, Overland Park, KS (US)

( * ) Notice: Subject to any disclaimer, the term of this patent is extended or adjusted under 35 U.S.C. 154(b) by 273 days.

(21) Appl. No.: 13/212,476

(22) Filed: Aug. 18, 2011

(51) Int. Cl.
*H04W 4/00* (2009.01)
(52) U.S. Cl.
USPC ........................................... 370/431
(58) Field of Classification Search
USPC ................................. 370/431–463
See application file for complete search history.

(56) References Cited

U.S. PATENT DOCUMENTS

| | | | |
|---|---|---|---|
| 7,812,766 B2 | 10/2010 | Leblanc et al. | |
| 7,860,518 B2 | 12/2010 | Flanagan et al. | |
| 8,135,403 B1 * | 3/2012 | Oh et al. | 455/435.1 |
| 8,229,397 B2 * | 7/2012 | Hou et al. | 455/410 |
| 2003/0222819 A1 * | 12/2003 | Karr et al. | 342/457 |
| 2005/0143091 A1 * | 6/2005 | Shapira et al. | 455/456.1 |
| 2008/0089282 A1 * | 4/2008 | Malladi et al. | 370/329 |
| 2008/0194226 A1 | 8/2008 | Rivas et al. | |
| 2010/0234045 A1 | 9/2010 | Karr et al. | |
| 2011/0244887 A1 * | 10/2011 | Dupray et al. | 455/456.2 |

* cited by examiner

*Primary Examiner* — Fan Ng (57) ABSTRACT

A distributed antenna system comprises a base antenna system and coverage antenna systems. The base antenna system wirelessly receives a network pilot signal and transfers the network pilot signal to a first coverage antenna system and to a second coverage antenna system. The first coverage antenna system wirelessly transfers the network pilot signal and a first pseudo-pilot signal that is correlated to a first location. The second coverage antenna system wirelessly transfers the network pilot signal and a second pseudo-pilot signal that is correlated to a second location. In some examples, user devices translate the pseudo-pilot signals into their correlated locations.

20 Claims, 6 Drawing Sheets

DISTRIBUTED ANTENNA SYSTEM WITH LOCATION DETERMINATION BASED ON PSEUDO-PILOT SIGNALS

TECHNICAL BACKGROUND

A distributed antenna system extends wireless communications with a network base station to areas that the network base station cannot adequately reach. In a typical configuration, the distributed antenna system receives wireless signals from the network base station into a base antenna system. The base antenna system produces a stronger and cleaner version of the received signal and transfers this cleaned-up version to a set of coverage antenna systems. The coverage antenna systems are placed at various locations that may be too distant from the network base station or that are shielded from the network base station by structural materials. The coverage antenna systems wirelessly transfer the signals to user communication devices at their location.

In a reciprocal fashion, the coverage antenna systems receive wireless signals from the user devices and transfer these signals to the base antenna system. The base antenna system wirelessly transfers these signals to the network base station. Thus, the distributed antenna system operates as a two-way wireless repeater between the user communication devices and the network base station.

The network base station wirelessly broadcasts a pilot signal to enable user communication devices to find and access the base station. The pilot signal is typically defined by frequency and protocol to identify the base station. The user devices include lists with prioritized pilot signal information that they use to look for various pilot signals. If a given user device receives a pilot signal with adequate signal strength, then the user device responds with an access request based on information from the pilot signal. The network may respond to the access request with an access grant and then provide wireless communication service to the user device. If the network does not respond to the access request within a time period, the user device will attempt to receive the next pilot signal in the prioritized list.

In a distributed antenna system scenario, the base antenna system receives the pilot signal from the network base station and the coverage antennas wirelessly re-broadcast the pilot signal to the user devices. The coverage antenna systems wirelessly receive the corresponding access requests from the user devices, and the base antenna system wirelessly transfers these access requests to the network base station. The base antenna system wirelessly receives the access grants (if any) from the network base station, and the coverage antenna systems wirelessly transfer these access grants to the user devices. These user devices then engage in communication sessions with remote systems and users over the distributed antenna system and the network base station.

When a user device needs to determine its geographic location, the device may use a Global Position Satellite (GPS) system to detect satellite signals and determine location. In some cases, wireless communication networks perform a triangulation process based on signal strength or signal delay to various base stations to locate user devices. A position determination system may also be used. User devices transfer data to the position determination system including GPS data and the signal strengths of recently received pilot signals. The position determination system processes the data to determine locations and provide location information to requesting devices.

OVERVIEW

A distributed antenna system comprises a base antenna system and coverage antenna systems. The base antenna system wirelessly receives a network pilot signal and transfers the network pilot signal to a first coverage antenna system and to a second coverage antenna system. The first coverage antenna system wirelessly transfers the network pilot signal and a first pseudo-pilot signal that is correlated to a first location. The second coverage antenna system wirelessly transfers the network pilot signal and a second pseudo-pilot signal that is correlated to a second location. In some examples, user communication devices translate the pseudo-pilot signals into their correlated locations.

DETAILED DESCRIPTION

Figure 1:
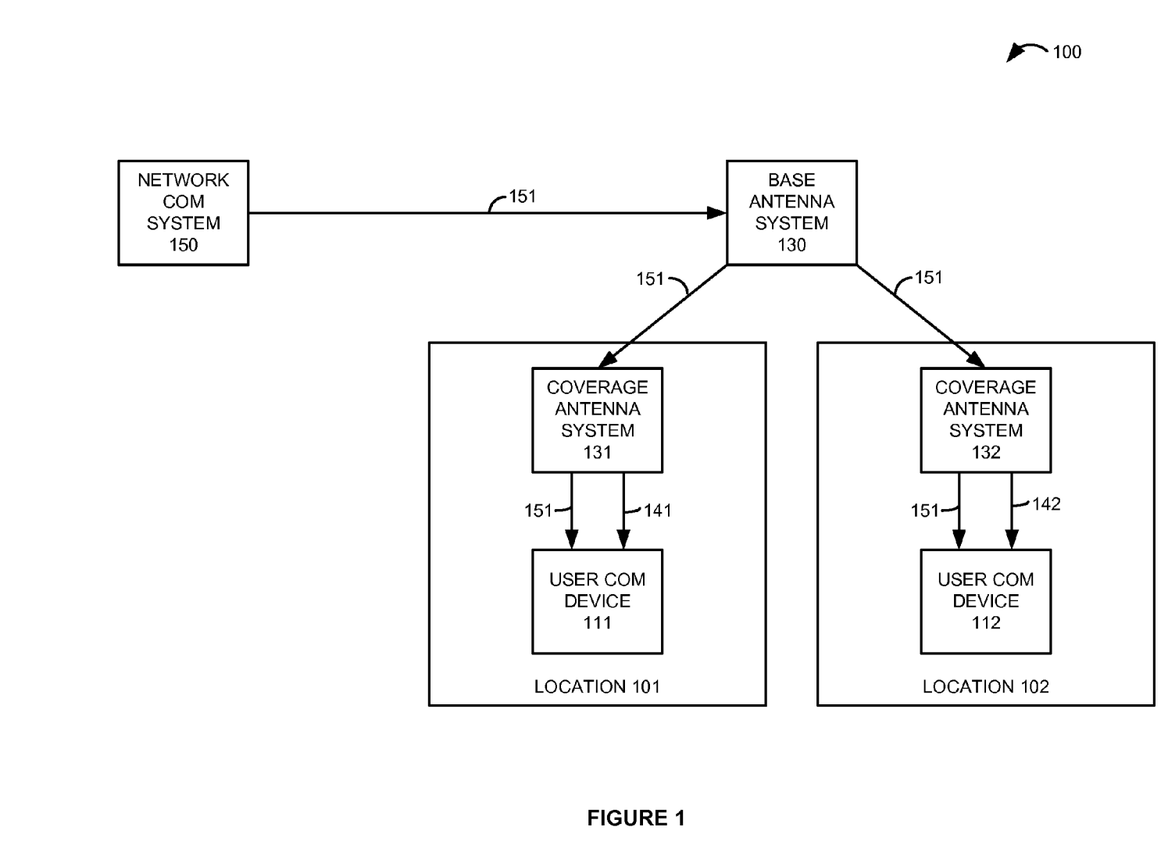
FIG. 1 illustrates a distributed antenna system that transmits pseudo-pilot signals to help user devices better determine their location.

FIG. 1 illustrates distributed antenna system 100 that transmits pseudo-pilot signals to help user devices better determine their location. Distributed antenna system 100 comprises base antenna system 130, coverage antenna systems 131-132, and user communication devices 111-112. User communication devices 111-112 could be phones, computers, internet appliances, machine transceivers, and the like. Antenna systems 130-132 comprise antenna elements, communication circuitry, memory, software, user interfaces, and possibly additional communication equipment. Base antenna system 130 and coverage antenna systems 131-132 exchange communication signals over links, such as optical fibers, coaxial cabling, air interfaces, add/drop components, and the like.

Coverage antenna system 131 and user communication device 111 are physically present at location 101. Coverage antenna system 132 and user communication device 112 are physically present at location 102. Locations 101-102 have geographical boundaries that are mutually exclusive. In some examples, locations 101-102 comprise different portions of a building, such as different floors. In other examples, locations 101-102 comprise different buildings at a site. In yet other examples, locations 101-102 comprise different building/floor combinations at a campus. Other types of precise location information could be associated with locations 101-102, such as proximal coordinates for latitude, longitude, and elevation.

Network communication system 150 is a wireless access node in a wide area network. Network communication system 150 wirelessly broadcasts pilot signal 151 to enable user devices to acquire wireless communication access. Base antenna system 130 wirelessly receives network pilot signal 151 from network communication system 150. Base antenna system 130 transfers network pilot signal 151 to both coverage antenna system 131 and coverage antenna system 132.

Coverage antenna system 131 generates pseudo-pilot signal 141 per frequency and protocol specifications, so pseudo-pilot signal 141 will be recognized as a pilot signal by user communication device 111. In an exemplary code division system, pseudo-pilot signal 141 would be the same as pilot signal 151, except that pseudo-pilot signal 141 would have a different PN offset. Pseudo-pilot signal 141 is correlated to location 101 by user communication device 111 or some other system, but pseudo-pilot signal 141 is not used to acquire communication service in the classic sense. Coverage antenna system 131 wirelessly transmits network pilot signal 151 and pseudo-pilot signal 141 to user communication device 111.

Coverage antenna system 132 generates pseudo-pilot signal 142 that is recognized as a pilot signal by user communication device 112. In an exemplary code division system, pseudo-pilot signal 142 would be the same as pilot signal 151 and pseudo-pilot signal 141, except that pseudo-pilot signal 142 would have a different PN offset. Pseudo-pilot signal 142 is correlated to location 102 by user communication device 112 or some other system, but pseudo-pilot signal 142 is not used to acquire communication service in the classic sense. Coverage antenna system 132 wirelessly transmits network pilot signal 151 and pseudo-pilot signal 142 to user communication device 112.

User communication device 111 scans for pilot signals and receives pseudo-pilot signal 141 and pilot signal 151. User communication device 111 attempts to use pseudo-pilot signal 141 to acquire wireless communication access, but the attempt fails. User communications device 111 notes the signal power of pseudo-pilot signal 141. User communication device 111 then successfully uses pilot signal 151 to acquire wireless communication access from network communication system 150 through distributed antenna system 100.

User communication device 112 scans for pilot signals and receives pseudo-pilot signal 142 and pilot signal 151. User communication device 112 attempts to use pseudo-pilot signal 142 to acquire wireless communication access, but the attempt fails. User communications device 112 notes the signal power of pseudo-pilot signal 142. User communication device 112 then successfully uses pilot signal 151 to acquire wireless communication access from network communication system 150 through distributed antenna system 100.

In some examples, user communication device 111 translates pseudo-pilot signal 141 into respective location 101, and user communication device 112 translates pseudo-pilot signal 142 into respective location 102. For example, software in user devices 111-112 could direct the devices to attempt to translate pilot signal data (such as PN offset). Standard pilot signals like signal 151 would not typically have translations, but pseudo-pilot signals would translate to location information, such as specific building/floor combinations or to specific latitude/longitude/elevation coordinates. User communication devices 111-112 could then use this precise location data for other services, such as emergency calls or location-based searches.

In other examples, user communication devices 111-112 report respective pseudo-pilot signals 141-142 to an external system that performs the location translations. For example, user devices 111-112 might report pilot signal information including pseudo-pilot signals 141-142 and their signal strengths to a position determination system coupled to network communication system 150. For user communication device 111, the position determination system would translate the strongest pseudo-pilot signal—signal 141—into location 101 for user communication device 111. For user communication device 112, the position determination system would translate the strongest pseudo-pilot signal—signal 142—into location 102 for user communication device 112. The position determination system then transfers the precise location information to respective user devices 111-112 or some other system.

Figure 2:
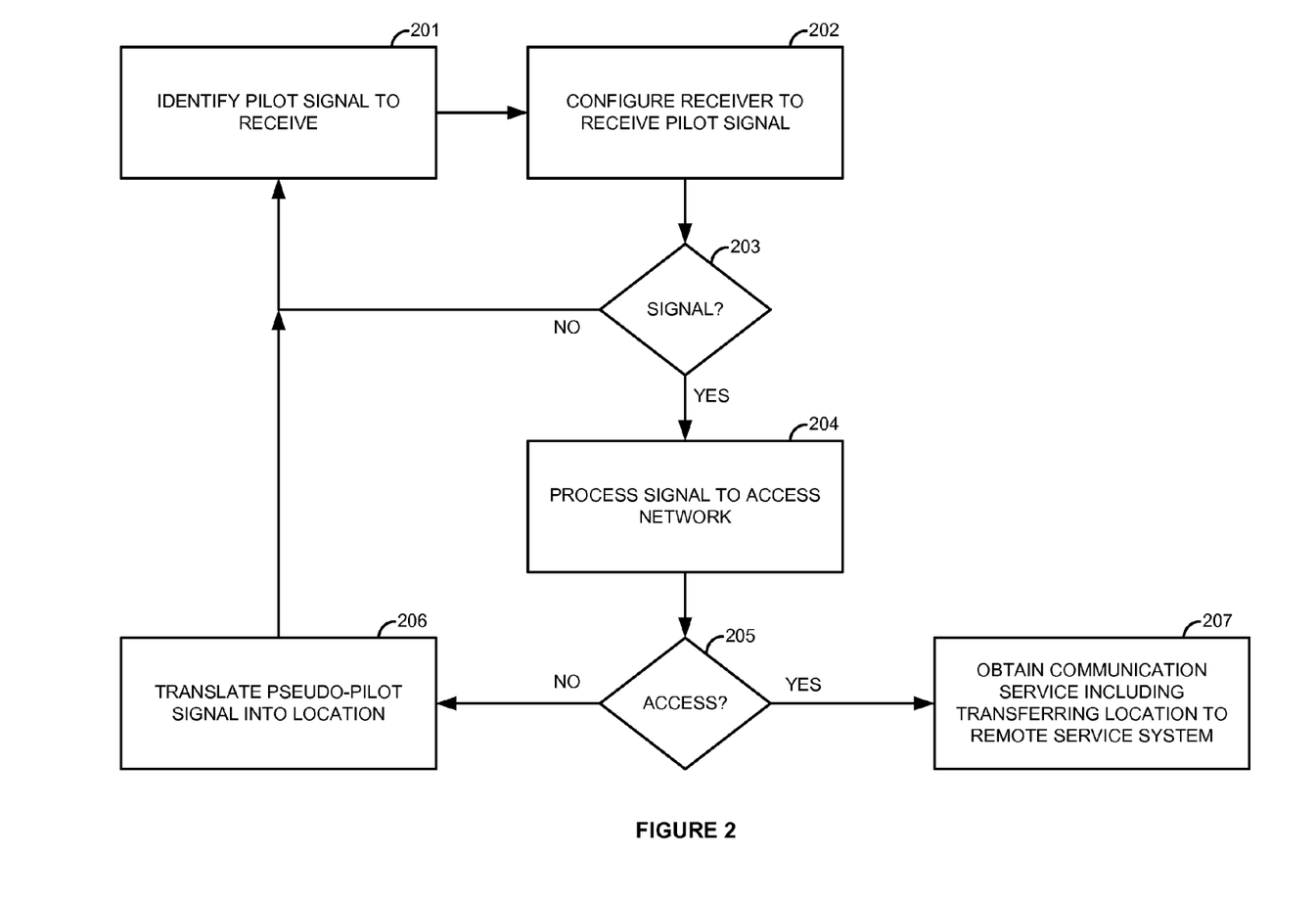
FIG. 2 illustrates the operation of a user communication device to receive and process a pseudo-pilot signal from a distributed antenna system to better determine its location.

FIG. 2 illustrates the operation of user communication device 111 to receive and process pseudo-pilot signal 141 from distributed antenna system 100 to better determine its location. The operation begins when device 111 identifies a pilot signal to receive (201). This typically entails accessing a prioritized list of pilot signal characteristics, such as frequency and protocol. User communication device 111 then configures its receiver to receive the highest priority pilot signal (202). If no pilot signal is received (203), then device 111 identifies the next pilot signal to receive (201). If a pilot signal is received (203), then device 111 processes the pilot signal to access network communication system 150 (204). If the access attempt is not successful (205), then device 111 translates pilot signal information into location information (206) and a new pilot is identified to receive (201). Note that the translation (206) may entail remote system access to obtain the translation. If the access attempt is successful (205), then device 111 obtains wireless communication service (207) which may include transferring the location information to a remote service system.

Figure 3:
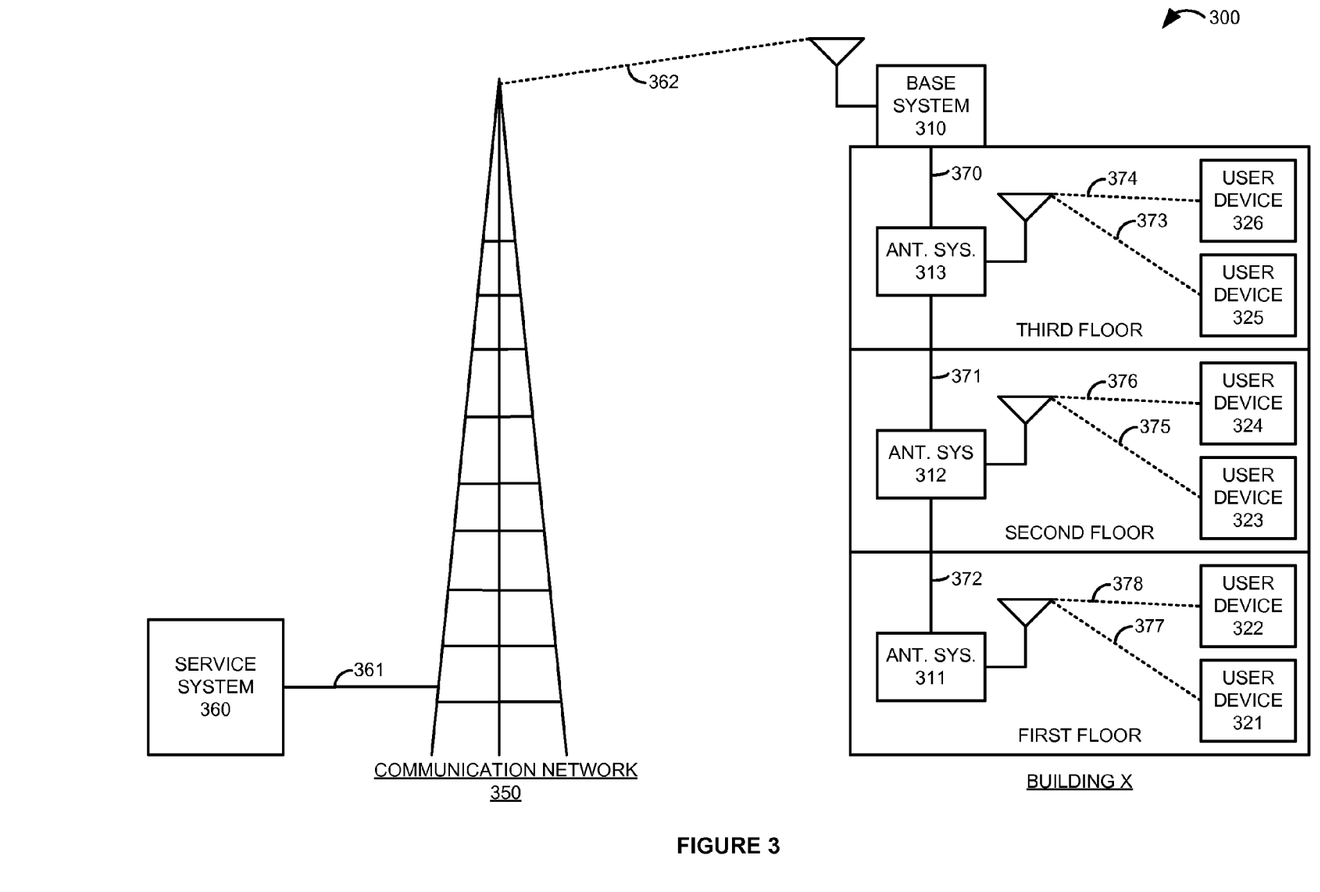
FIG. 3 illustrates a distributed antenna system that helps user communication devices determine their specific building and floor.

FIG. 3 illustrates distributed antenna system 300 that helps user communication devices 321-326 determine their specific building and floor. Distributed antenna system 300 comprises: base antenna system 310, coverage antenna systems 311-313, and user communication devices 321-326. Base antenna system 310 is located on the top of Building X (although portions of system 310 may be more protected within the building). Coverage antenna system 313 and user communication devices 325-326 are located on the third floor of Building X. Coverage antenna system 312 and user communication devices 323-324 are located on the second floor of Building X. Coverage antenna system 311 and user communication devices 321-322 are located on the first floor of Building X. Although not shown, additional buildings could be equipped and operate in a similar manner.

Service system 360 and communication network 350 communicate over network link 361. Communication network 350 and base antenna system 310 communicate over wireless link 362. Base antenna system 310 and coverage antenna system 313 communicate over optical link 370. Base antenna system 310 and coverage antenna system 312 communicate over optical links 370-371. Base antenna system 310 and coverage antenna system 311 communicate over optical links 370-372. Coverage antenna system 311 and user communication devices 321-322 communicate over respective wireless links 377-378. Coverage antenna system 312 and user communication devices 323-324 communicate over respective wireless links 375-376. Coverage antenna system 313 and user communication devices 325-326 communicate over respective wireless links 373-374.

Figure 4:
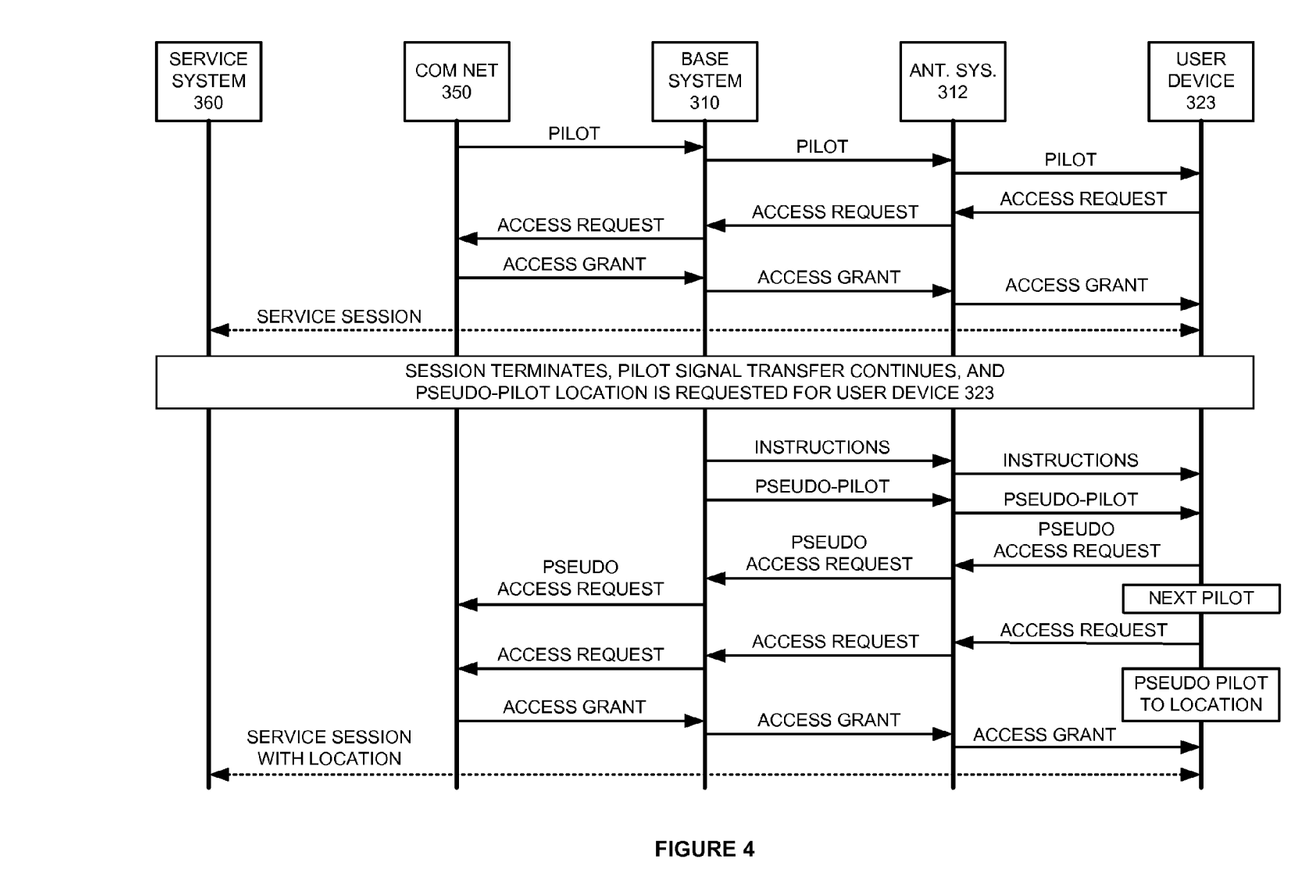
FIG. 4 illustrates the operation of the distributed antenna system to help the user communication devices determine their specific building and floor.

FIG. 4 illustrates the operation of distributed antenna system 300 to help user communication devices 321-326 determine their specific building and floor. Note that some coverage antenna systems and user communication devices are not shown on FIG. 4, but there operation would be similar to that shown. Communication network 350 wirelessly transfers a pilot signal to enable user devices to acquire the network, and base antenna system 310 receives the pilot signal. Base antenna system 310 converts the wireless pilot signal into an optical pilot signal and transfers the optical pilot signal to coverage antenna system 312. Coverage antenna system 312 converts the optical pilot signal to a wireless pilot signal and wirelessly transmits the wireless pilot signal. User communication device 323 wirelessly receives the pilot signal.

User communication device 323 processes pilot signal information to generate and wirelessly transfer an access request that is received by coverage antenna system 312. Coverage antenna system 312 converts the wireless access request to an optical access request and transfers the optical access request to base antenna system 310. Base antenna system 310 processes the optical access request to wirelessly transmit the access request to communication network 350. Communication network 350 processes the access request to generate and wirelessly transfer an access grant to base antenna system 310.

Base antenna system 310 converts the wireless access grant into an optical access grant and transfers the optical access grant to coverage antenna system 312. Coverage antenna system 312 converts the optical access grant to a wireless access grant and wirelessly transmits the wireless access grant. User communication device 323 wirelessly receives the access grant. User device 323 then engages in a service session with service system 360 over communication network 350 and distributed antenna system 300. The service could be an emergency service, video service, or some other communication service. Eventually, the service session terminates between service system 360 and user device 323. Note that communication network 350 and coverage antenna system 312 continue to broadcast the pilot signal as described above.

At this point, a more precise location is requested for user device 323. The request could be from the user, their employer, their landlord, service system 360, or some other requesting system. In response to the request, communication network 350 transfers instructions to base antenna system 310. Base antenna system 310 may execute some of the instructions to initiate or modify pseudo-pilot signal transmission, although base station system 310 may already be configured for pseudo-pilot signal transmission. Base antenna system 310 transfers the instructions to user device 323 through coverage antenna 312. User device 323 processes the instructions to configure itself to process pseudo-pilot signals to determine location by building and floor. The configuration entails loading pseudo-pilot signal information in the top of a pilot signal list that user device 323 uses to acquire communication access. The configuration also includes storing pseudo-pilot signal/location translations and implementing pseudo-pilot signal translation triggers.

Base antenna system 310 generates an optical pseudo-pilot signal that correlates to the second floor of building X and transfers the optical pseudo-pilot signal to coverage antenna 312. Coverage antenna 312 transfers the pseudo-pilot signal to user communication device 323. Note that base antenna system 310 and coverage antenna system 312 continue to repeat the pilot signal from network 350. To accomplish the dual broadcast, base antenna system 310 mixes the network pilot signal and the pseudo pilot signal with the pseudo pilot signal having the higher transmit power. In some examples, the power difference is around 25%.

Coverage antenna system 312 transfers the pseudo-pilot signal at a higher power than the network pilot signal. Based on the pilot signal list and the higher power, user communication device 323 scans for and receives the pseudo pilot signal. User communication device 323 processes pseudo-pilot signal information to generate and wirelessly transfer a pseudo-access request that is received by coverage antenna system 313. Coverage antenna system 313 transfers the pseudo-access request to base antenna system 310, and base antenna system 310 wirelessly transfers the pseudo-access request to communication network 350. Communication network 350 ignores the request because it is not based on its own network pilot signal.

After a time period without any access grant, user communication device 323 scans for the next pilot signal in the pilot signal list, and this time, user device 323 receives the network pilot signal. User communication device 323 processes network pilot signal information to generate and wirelessly transfer an access request to coverage antenna system 312. Coverage antenna system 312 transfers the access request to base antenna system 310, and base antenna system 310 wirelessly transfers the access request to communication network 350. Communication network 350 processes the access request to generate and wirelessly transfer an access grant to base antenna system 310. Base antenna system 310 transfers the access grant to coverage antenna system 312, and coverage antenna system 312 wirelessly transfers the access grant. User communication device 323 wirelessly receives the access grant.

While user communication device 323 is accessing network 350 with its actual pilot signal, device 323 also translates the pseudo-pilot signal information into the location information indicating the second floor of building X. The translation is based on the previous configuration instructions and could be triggered by the failure to obtain communication access with the highest power pilot signal. After the access grant, user device 323 engages in another service session with service system 360 over communication network 350 and distributed antenna system 300. During the service session, user communication device 323 provides its precise location—the second floor of building X.

In the above operation, antenna systems 310 and 312 may continuously or periodically transfer the pseudo-pilot signal at a higher power than the network pilot signal. Periodic transfers could be based on a pre-determined schedule or be in response to an instruction from network 350. Within user communication device 323, the precise building/floor location may expire after a time period. In addition, user communication device 323 may periodically check for the pseudo-pilot to verify the specific building/floor location.

Figure 5:
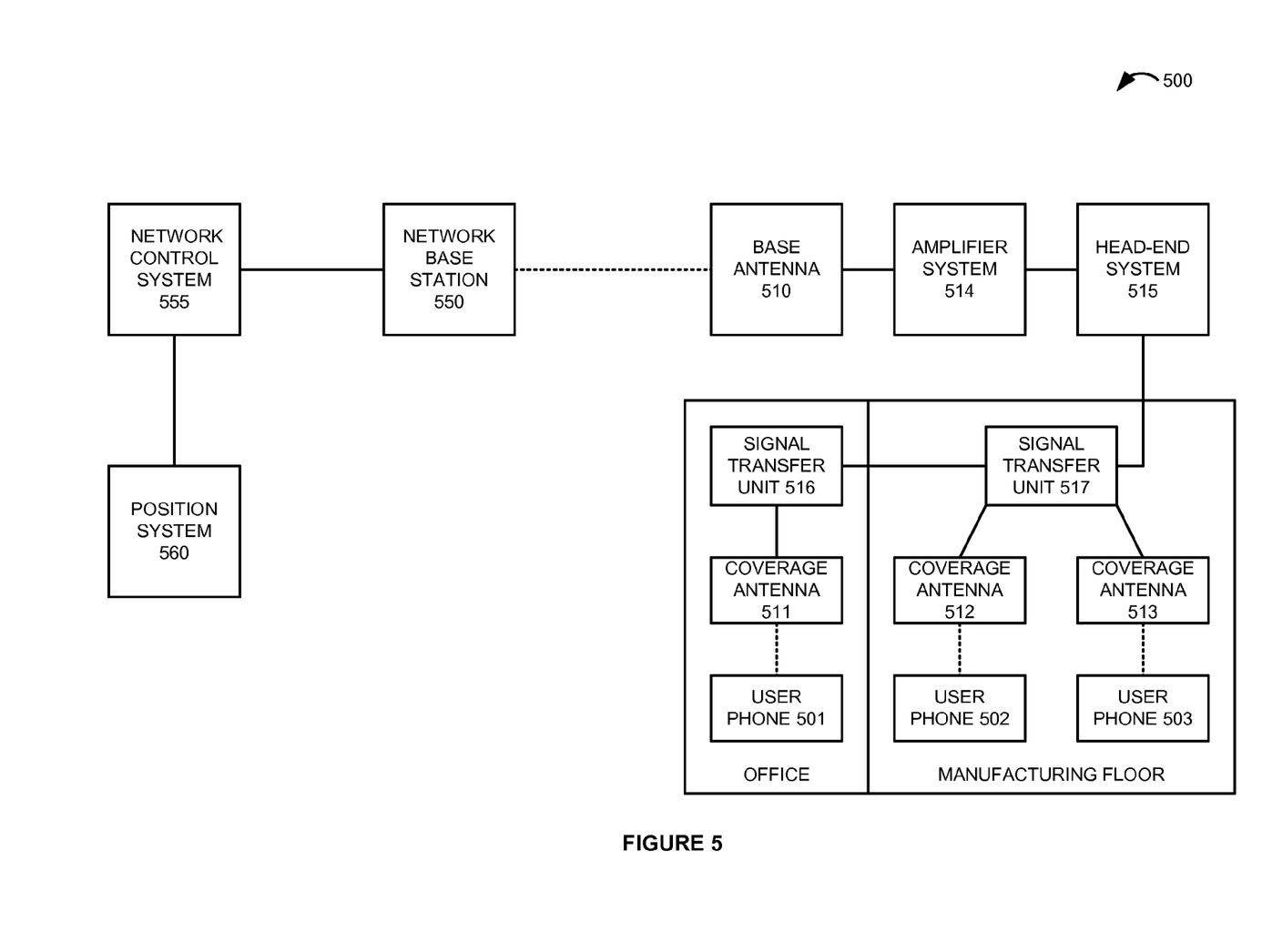
FIG. 5 illustrates a distributed antenna system that helps user communication devices access a remote positioning system to better determine their location.

FIG. 5 illustrates distributed antenna system 500 that helps user phones 501-503 determine their specific location at an industrial site. Distributed antenna system 500 comprises base antenna 510, amplifier system 514, head-end system 515, signal transfer units 516-517, and coverage antennas 511-513.

Base antenna 510 receives a pilot signal from network base station 550 and transfers the network pilot signal to amplifier system 514 which is co-located with the base antenna 510 on a tower. Amplifier system 514 transfers an amplified pilot signal to head-end system 515 which is located in a protected area. Head-end system 515 distributes the pilot signal to coverage antennas 511-513 through signal transfer units 516-517 that perform drop and insert operations. Coverage antennas 511-513 wirelessly broadcast the pilot signal to user phones 501-503.

Head-end system 515 also drives coverage antennas 511-513 to broadcast their own unique pseudo-pilot signal along with the pilot signal from base station 550. The unique pseudo-pilot signals are correlated to locations proximate to their respective coverage antenna, such as an office area or sections of a manufacturing floor. These correlations are stored in positioning system 560. Positioning system 560 is a computer platform that processes data from user devices and communication networks to assist the user devices in location determination.

User phones 501-503 are configured with the pseudo-pilot signals at the top of their signal lists. Periodically, user phones 501-503 use their signal list to attempt to obtain communication access. User phones 501-503 will scan and note the pseudo-pilot signals that they receive in this process—including recording the signal strength of each pilot. Since none of the pseudo-pilot signals work for actual communication access, phones 501-503 eventually use the network pilot signal from base station 550 for communication access through distributed antenna system 500. When communication access is obtained, phones 501-503 transfer their record of pilot signals and received power to positioning system 560 over distributed antenna system 500, base station 550, and network control system 555. Positioning system 560 processes the records of pilot signals and received power to identify the pseudo-pilot signals with the highest power for each phone. Based on based on its stored correlations, positioning system 560 then translates the identified pseudo-pilot signals into their precise locations, such as the specific office area or manufacturing floor. Positioning system 560 then transfers the precise location to each phone.

Figure 6:
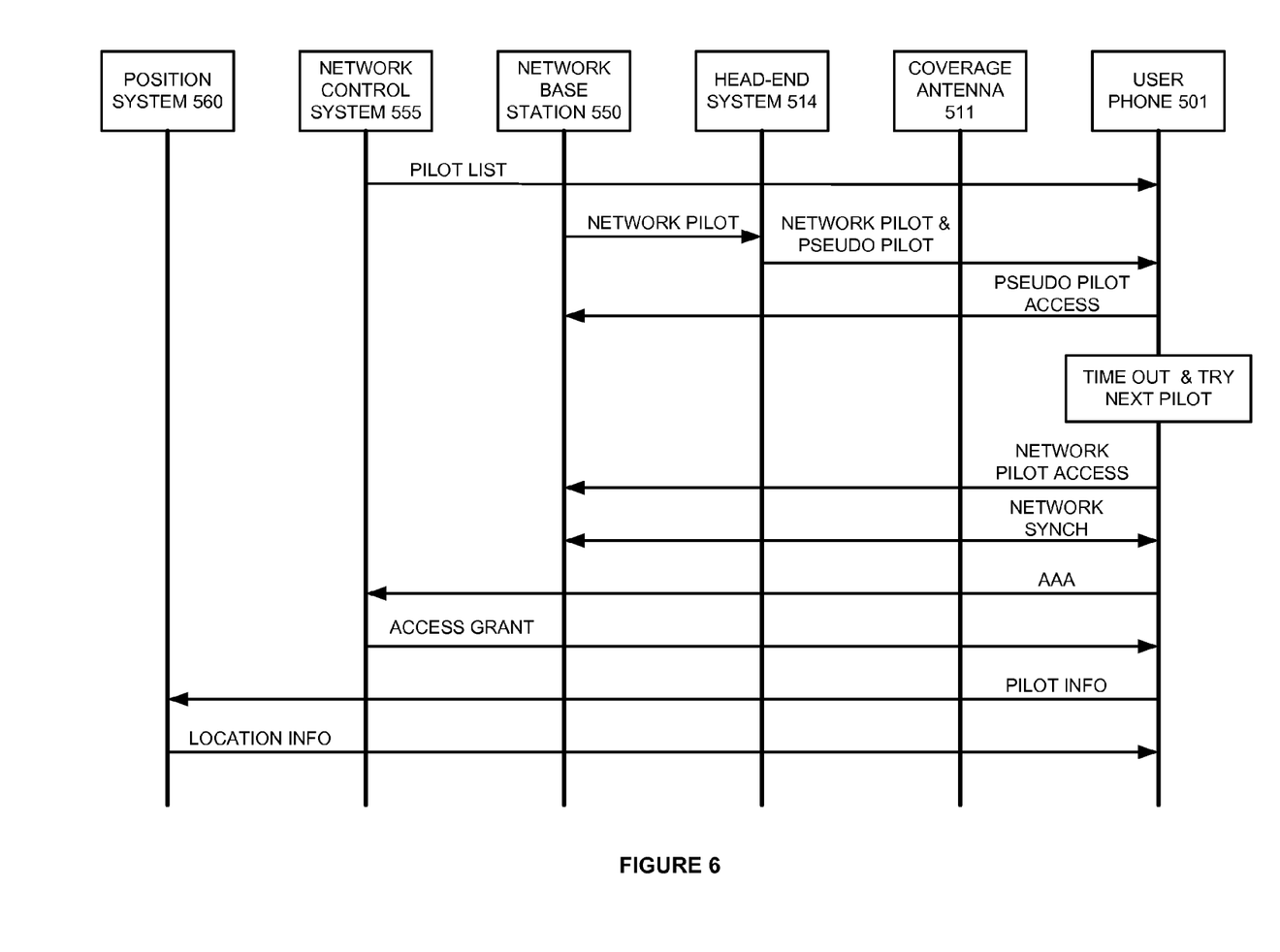
FIG. 6 illustrates the operation of a distributed antenna system to help user communication devices access a remote positioning system to better determine their location.

FIG. 6 illustrates the operation of distributed antenna system 500 to help user phone 501 determine its specific location at an industrial site. Network control system 555 transfers a prioritized pilot signal list to user phone 501. This prioritized list has pseudo-pilot signals at the top and then operational pilot signals at the bottom. The pseudo-pilot signals are correlated to locations, and the locations each contain one or more associated coverage antennas.

Network base station 550 broadcasts its pilot signal which is processed by head-end system 515. Head-end system 515 re-generates the network pilot signal for each coverage antenna and mixes in the appropriate pseudo-pilot signal for each coverage antenna based on the correlation of pseudo-pilot signal, location, and coverage antenna. Thus, coverage antennas 511-513 each receive the same network pilot signal and their own pseudo-pilot signal for their location. Coverage antenna 511 receives the pseudo-pilot signal for the office location. Coverage antenna 511 wirelessly broadcasts the network pilot signal and the pseudo-pilot signal for the office location.

Based on its list from network control system 555, user phone 501 scans for and receives the pseudo-pilot signal from coverage antenna 511—recording its strong signal power. User phone 501 attempts access with the pseudo pilot signal, but the pseudo access request is ignored by network base station 550. Phone 501 times out waiting for a response to its pseudo access attempt and tries another pilot signal from the list. If the next pilot signal is a pseudo-pilot, then the above process repeats. If the next pilot signal is from base station 550, then user phone 501 receives and uses the network pilot signal to successfully request communication access. In response to the network pilot access request, user phone 501 and base station 550 synchronize with one another, and then user phone 501 and network control system 555 execute an Authentication, Authorization, and Accounting (AAA) procedure. Network control system 555 then sends an access grant to user phone 501.

Once communication access is gained, user phone 501 transfers its record of pseudo-pilot signals and signal power to positioning system 560. Phone 501 may transfer other data, such as GPS data and network pilot signal information. Positioning system 560 processes the records and other information to determine location. Since the records indicate that the pseudo-pilot signal for the office location is strongest pseudo-pilot for user phone 501, then positioning system 560 can readily determine that phone 501 is at the office location by translating the strongest pseudo-pilot signal into the specific office location based on the stored correlations. Positioning system 560 transfers location information indicating the specific office location to user phone 501.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a distributed antenna system, the method comprising:
   wirelessly receiving a network pilot signal in a base antenna system and transferring the network pilot signal to a first coverage antenna system and to a second coverage antenna system;
   wirelessly transferring the network pilot signal and a first pseudo-pilot signal from the first coverage antenna system, wherein the first pseudo-pilot signal is correlated to a first location;
   wirelessly transferring the network pilot signal and a second pseudo-pilot signal from the second coverage antenna system, wherein the second pseudo-pilot signal is correlated to a second location.

2. The method of claim 1 wherein:
   the first location comprises a first portion of a building;
   the second location comprises a second portion of the building; and
   the first portion of the building and the second portion of the building are mutually exclusive.

3. The method of claim 1 further comprising:
   in a first user communication device, wirelessly receiving the first pseudo-pilot signal and translating the first pseudo-pilot signal into the first location; and
   in a second user communication device, wirelessly receiving the second pseudo-pilot signal and translating the second pseudo-pilot signal into the second location.

4. The method of claim 3 wherein the first location comprises a first building and floor combination and the second location comprises a second building and floor combination.

5. The method of claim 3 wherein:
   translating the first pseudo-pilot signal into the first location comprises transferring first pseudo-pilot signal information from the first user communication device for delivery to a position system, receiving first location information responsively transferred by the position system, and processing the first location information to identify the first location, wherein the position system processes the first pseudo-pilot signal information to determine and transfer the first location information; and
   translating the second pseudo-pilot signal into the second location comprises transferring second pseudo-pilot signal information from the second user communication device for delivery to the position system, receiving second location information responsively transferred by the position system, and processing the second location information to identify the second location, wherein the position system processes the second pseudo-pilot signal information to determine and transfer the second location information.

6. The method of claim 1 wherein wirelessly transferring the network pilot signal and the first pseudo-pilot signal from the first coverage antenna system comprises wirelessly transferring the first pseudo-pilot signal at a higher power level than the network pilot signal.

7. The method of claim 6 further comprising:
in a user communication device, wirelessly receiving the first pseudo-pilot signal and wirelessly transferring a first access request responsive to the first pseudo-pilot signal,
in the user communication device, determining that the first access request was not successful, and in response, wirelessly receiving the network pilot signal and wirelessly transferring a second access request responsive to the network pilot signal;
in the user communication device, translating the first pseudo-pilot signal into the first location responsive to the first pseudo-pilot signal having a higher power than the network pilot signal and the first access request being unsuccessful.

8. The method of claim 7 further comprising:
wirelessly receiving the second access request in the first coverage antenna system;
transferring the second access request from the first coverage antenna system to the base antenna system;
wirelessly transferring the second access request from the base antenna system and responsively receiving an access grant in the base antenna system;
transferring the access grant from the base antenna system to the first coverage antenna system;
wirelessly transferring the access grant from the first coverage antenna system.

9. The method of claim 8 further comprising:
in the user communication device, wirelessly receiving the access grant, and in response, accessing a communication service.

10. The method of claim 9 wherein accessing the communication service comprises wirelessly transferring the first location for delivery to a remote service system.

11. A distributed antenna system comprising:
a base antenna system configured to wirelessly receive a network pilot signal and transfer the network pilot signal to a first coverage antenna system and to a second coverage antenna system;
the first coverage antenna system configured to wirelessly transfer the network pilot signal and a first pseudo-pilot signal, wherein the first pseudo-pilot signal is correlated to a first location; and
the second coverage antenna system configured to wirelessly transfer the network pilot signal and a second pseudo-pilot, wherein the second pseudo-pilot signal is correlated to a second location.

12. The distributed antenna system of claim 11 wherein:
the first location comprises a first portion of a building;
the second location comprises a second portion of the building; and
the first portion of the building and the second portion of the building are mutually exclusive.

13. The distributed antenna system of claim 11 further comprising:
a first user communication device configured to wirelessly receive the first pseudo-pilot signal and translate the first pseudo-pilot signal into the first location;
a second user communication device configured to wirelessly receive the second pseudo-pilot signal and translate the second pseudo-pilot signal into the second location.

14. The distributed antenna system of claim 13 wherein the first location comprises a first building and floor combination and the second location comprises a second building and floor combination.

15. The distributed antenna system of claim 13 wherein:
to translate the first pseudo-pilot signal into the first location, the first user communication device is configured to transfer first pseudo-pilot signal information for delivery to a position system, receive first location information responsively transferred by the position system, and process the first location information to identify the first location, wherein the position system processes the first pseudo-pilot signal information to determine and transfer the first location information; and
to translate the second pseudo-pilot signal into the second location, the second user communication device is configured to transfer second pseudo-pilot signal information for delivery to the position system, receive second location information responsively transferred by the position system, and process the second location information to identify the second location, wherein the position system processes the second pseudo-pilot signal information to determine and transfer the second location information.

16. The distributed antenna system of claim 11 wherein the first coverage antenna system is configured to wirelessly transfer the first pseudo-pilot signal at a higher power level than the network pilot signal.

17. The distributed antenna system of claim 16 further comprising:
a user communication device configured to wirelessly receive the first pseudo-pilot signal and wirelessly transfer a first access request responsive to the first pseudo-pilot signal;
the user communication device configured to determine that the first access request was not successful, and in response, wirelessly receive the network pilot signal and wirelessly transfer a second access request responsive to the network pilot signal;
the user communication device configured to translate the first pseudo-pilot signal into the first location responsive to the first pseudo-pilot signal having a higher power than the network pilot signal and the first access request being unsuccessful.

18. The distributed antenna system of claim 17 wherein:
the first coverage antenna system is configured to wirelessly receive the second access request and transfer the second access request to the base antenna system;
the base antenna system is configured to wirelessly transfer the second access request, responsively receive an access grant, and transfer the access grant to the first coverage antenna system;
the first antenna system is configured to wirelessly transfer the access grant.

19. The distributed antenna system of claim 18 wherein the user communication device is configured to wirelessly receive the access grant, and in response, access a communication service.

20. The distributed antenna system of claim 19 wherein the user communication device is configured to wirelessly transfer the first location for delivery to a remote service system over the communication service.

* * * * *